United States Patent [19]

Shean et al.

[11] Patent Number: 5,044,317
[45] Date of Patent: Sep. 3, 1991

[54] ADJUSTABLE ANIMAL BOXING (CAGE)

[76] Inventors: James J. Shean, 1041 Castle Hill Ave., Bronx, N.Y. 10472; George Spector, 233 Broadway, Rm. 3815, New York, N.Y. 10007

[21] Appl. No.: 577,201

[22] Filed: Sep. 4, 1990

[51] Int. Cl.[5] .............................................. A01K 31/00
[52] U.S. Cl. ........................................ 119/17; 119/19
[58] Field of Search .................... 119/15, 17, 19, 20, 119/151; 52/DIG. 13

[56] References Cited

U.S. PATENT DOCUMENTS

| | | | |
|---|---|---|---|
| 1,839,673 | 1/1932 | Hartmann | 119/15 |
| 3,498,265 | 3/1970 | Sterner | 119/17 |
| 3,807,112 | 4/1974 | Perina | 52/DIG. 13 X |
| 4,028,855 | 6/1977 | Prewer | 52/DIG. 13 X |
| 4,430,835 | 2/1984 | Ericson | 52/DIG. 13 X |
| 4,736,709 | 4/1988 | Migler | 119/15 X |

*Primary Examiner*—Gene Mancene
*Assistant Examiner*—R. Thomas Price

[57] ABSTRACT

An adjustable animal cage is provided and consists of a grid configuration enclosure, a pair of support bars removably installed horizontally in a spaced apart relationship in the enclosure and a pair of separator partitions which are removably attached on either side of the support bars thereto so as to split the enclosure into two variable sized spaces to house animals therein.

5 Claims, 1 Drawing Sheet

ADJUSTABLE ANIMAL BOXING (CAGE)

BACKGROUND OF THE INVENTION

The instant invention relates generally to animal cages and more specifically it relates to an adjustable animal cage which provides a structure which fits into the cage to separate the cage into two parts.

There are available various conventional animal cages which do no provide the novel improvements of the invention herein disclosed.

SUMMARY OF THE INVENTION

A primary object of the present invention is to provide an adjustable animal cage that will overcome the shortcomings of the prior art devices.

Another object is to provide an adjustable animal cage in which a separator structure can be removably installed within a standard animal cage to split the cage into various changeable areas.

An additional object is to provide an adjustable animal cage in which the separator structure can be utilized to selectively partition off portions of the cage to form smaller and larger areas for an animal to be housed in.

A further object is to provide an adjustable animal cage that is simple and easy to use.

A still further object is to provide an adjustable animal cage that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figure 1:
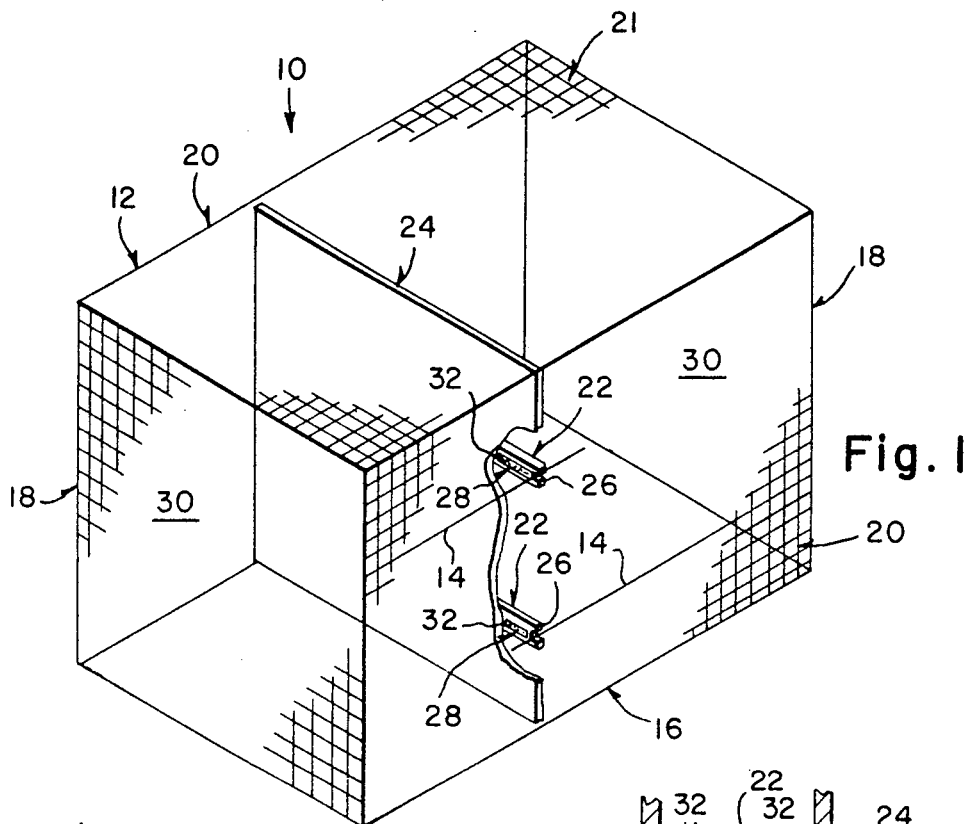
FIG. 1 is a perspective view of a cage with the invention installed therein.

Turning now descriptively to the drawings, in which similar reference characters denote similar elements throughout the several views, the Figures illustrate an adjustable animal cage 10 consisting of an enclosure 12 being of a plurality of rods 14 forming a grid configuration. The enclosure 12 has a floor 16, opposed ends 18, opposed sides 20 and a top 21. A pair of support bars 22 and a pair of separator partitions 24 are also provided.

Each support bar 22 has opposed recessed ends 26 so that the support bars 22 can be removably installed horizontally in a spaced apart relationship along one of a plurality of positions between the opposed sides 20 of the enclosure with each recessed end 26 to receive one of the rods 14. Each separator partition 24 is sized to fit vertically into the enclosure 12 to extend between the opposed sides 20 thereof.

Figure 2:
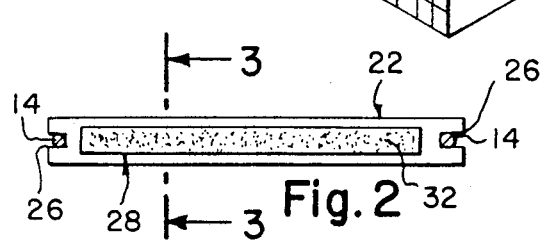
FIG. 2 is a front view of one of the support bars.
Figure 3:
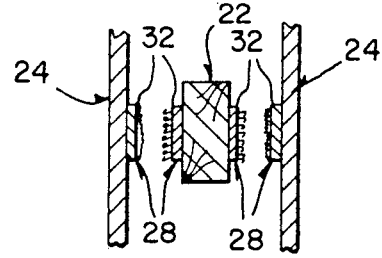
FIG. 3 is a cross sectional view taken along line 3—3 in FIG. 2, showing two separator partitions being attached thereto.
Figure 4:
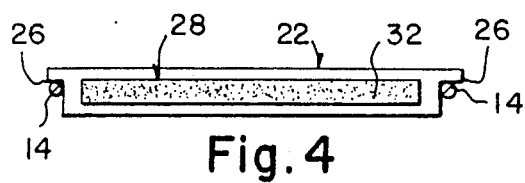
FIG. 4 is a front view similar to FIG. 2 of a modified support bar with L-shaped end notches so that the support bar can be easily installed within the cage.

A mechanism 28 is for removably attaching each separator partition 24 against one surface of the support bars 22 so that the support bars will be between the separator partitions 24 while the enclosure 12 will be split into two variable sized spaces 30 to house animals therein. The removable attaching mechanism 28 includes two sets of horizontally positioned hook and loop fabric fastener strips 32. Each recessed end 26 in each support bar 22 can be U-shaped to receive one of the rods 14, as shown in FIGS. 1 and 2. Each recessed end 26 in each support bar can also be undercut to better receive one of the rods 14, as shown in FIG. 4.

Figure 5:
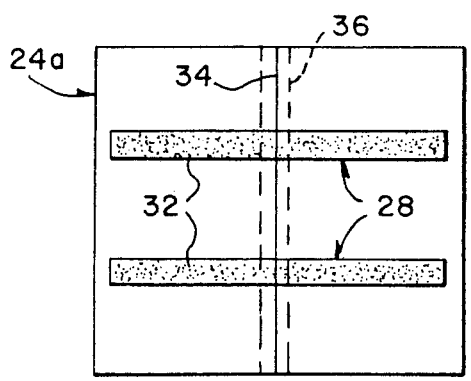
FIG. 5 is a front view of a modified separator partition split vertically in half and hinged together so that the separator partition can be easily installed within the cage.

A modified separator partition 24a, shown in FIG. 5, is vertically split down the middle at 34 and includes a hinge 36 along the split 34 opposite from the fabric fastener strips 32 so that the separator partition 24a can be folded to be easily installed within the enclosure 12.

Figures 6, 7, 8:
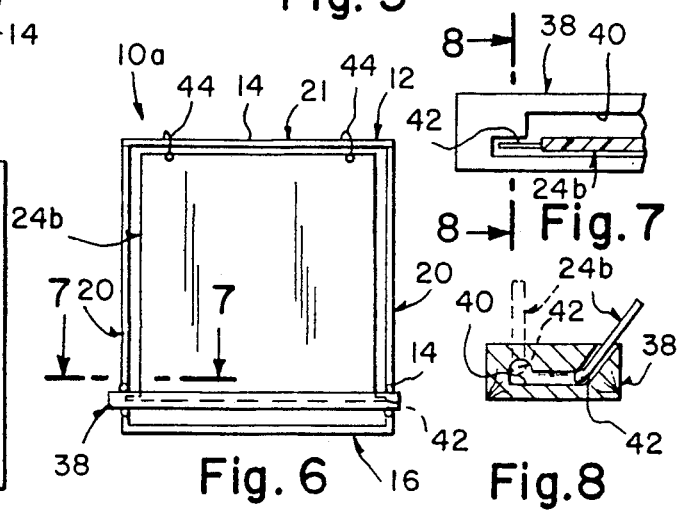
FIG. 6 is a cross sectional view taken through the cage showing a shade divider type separator partition installed therein.
FIG. 7 is a cross sectional view taken along line 7—7 in FIG. 6 showing the end portion of the bottom bar.
FIG. 8 is a cross sectional view taken along line 8—8 in FIG. 7 showing the retainer slot in greater detail.

A modified adjustable animal cage 10a is shown in FIGS. 6 to 8 and consists of the enclosure 12 as shown in FIG. 1. A base plate 38 that has opposing spaced retainer slots 40 therein is removably installed horizontally along one of a plurality of positions between the lower rods 14 of the opposed sides 20 of the enclosure 12 with the retainer slots 40 located on top. A shade divider type separator partition 24b is provided having a shaft 42 extending across its lower edge to fit into retainer slots 40 of the base plate 38. A pair of hooks 44 removably attach the upper edge of the shade divider type separator partition 24b to one of the rods 14 on the top 21 of the enclosure 12 so that the enclosure 12 will be split into two variable sized spaces 30 to house animals therein. Partitions 24b is removed from plate 38 by sliding shaft 42 laterally out of slots 40 for storage on the cage bottom.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. An adjustable animal cage comprising:
   (a) an enclosure being of a plurality of rods forming a grid configuration having a floor, opposed ends, opposed sides and a top;
   (b) a pair of support bars, each having opposed recessed ends so that said support bars can be removably installed horizontally in a spaced apart relationship along one of a plurality of positions between the opposed sides of said enclosure with each recessed end to receive one of the rods;
   (c) a pair of separator partitions, each sized to fit vertically into said enclosure to extend between the opposed sides thereof; and (d) means for removably attaching each said separator partitions against one surface of said support bars so that said support bars will be between said separator partitions, while said enclosure will be split into two variable sized spaces to house animals therein.

2. An adjustable animal cage as recited in claim 1, wherein said removably attaching means includes two sets of horizontally positioned hook and loop fabric fastener trips.

3. An adjustable animal cage as recited in claim 2, wherein each recessed end in each said support bar is U-shaped to receive one of the rods.

4. An adjustable animal cage as recited in claim 2, wherein each said separator partition is vertically split down the middle and includes a hinge along the split opposite form said fabric fastener strips so that said separator partition can be folded to be easily installed within said enclosure.

5. An adjustable animal cage as recited in claim 2, wherein each said recessed ends in said support bars is formed by an undercut to better receive one of the rods.

* * * * *